Jan. 19, 1954     J. T. CRONKHITE     2,666,445
DEVICE FOR CONTROLLING FLOW IN PIPE LINES
Filed July 28, 1950     2 Sheets-Sheet 1
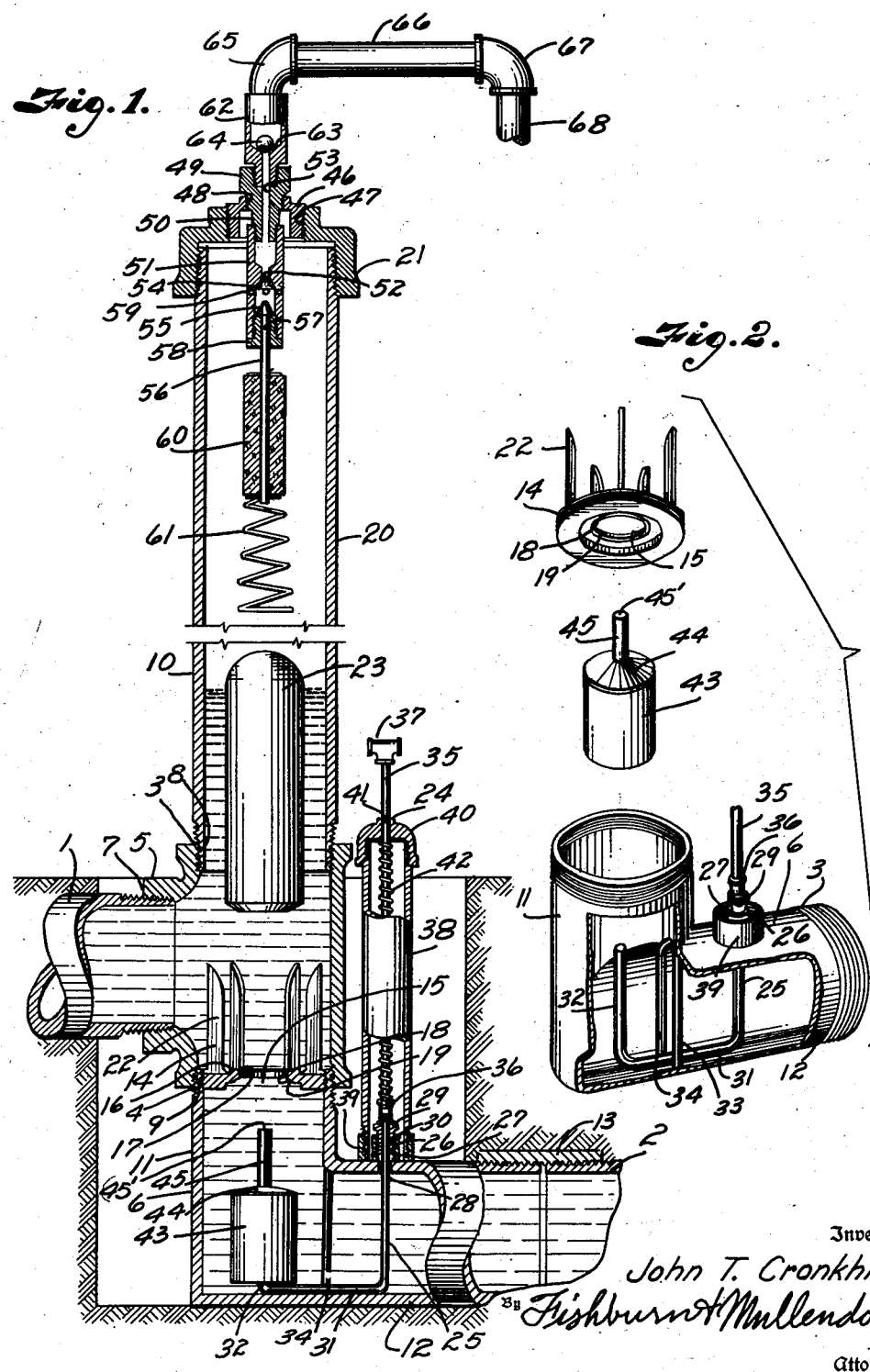
Inventor
John T. Cronkhite
By Fishburn & Mullendore
Attorneys

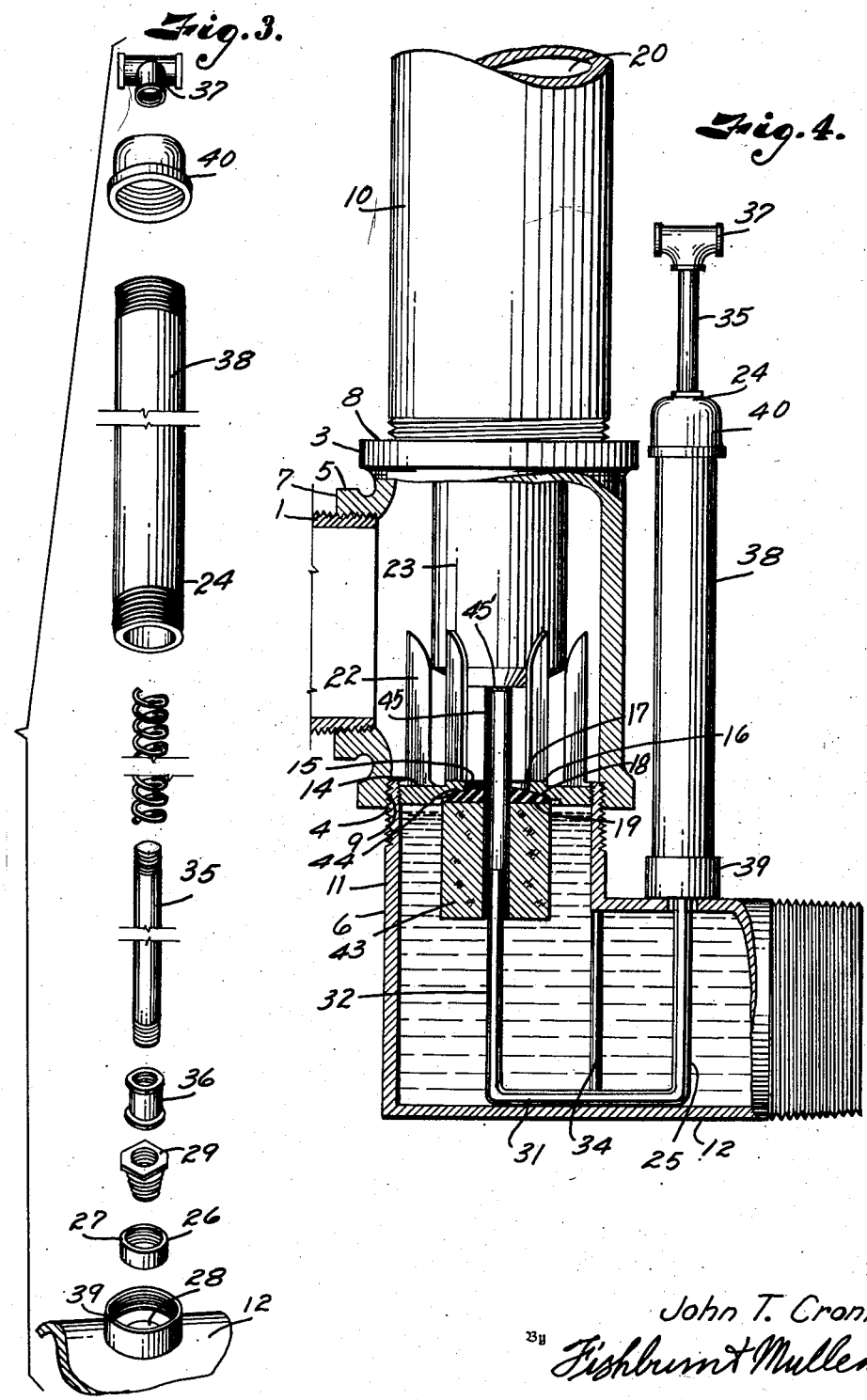

Patented Jan. 19, 1954

2,666,445

UNITED STATES PATENT OFFICE 2,666,445

DEVICE FOR CONTROLLING FLOW IN PIPE LINES

John T. Cronkhite, Tulsa, Okla.

Application July 28, 1950, Serial No. 176,414

9 Claims. (Cl. 137—198)

This invention relates to a device for controlling flow in pipe lines, for example, the gathering lines connecting a battery of field tanks in a petroleum producing area with a suction or pumping line of a gathering system. Usually each producer of petroleum has a number of measuring or gauging tanks located at various sites about his producing area, and since they are all interconnected to a common suction line of a gathering system, the discharge line from each tank is provided with a shutoff valve which closes automatically when a tank is substantially empty to prevent air and gas from being drawn into the suction line.

The tanks are usually located at different elevations because of the terrain of the producing area so that the discharge line of the lower tanks must also be provided with a check valve to prevent flow of liquid from a higher tank into one of the lower tanks. After a shutoff valve is operated to close flow from an empty tank, it is necessary to manually unseat the valve after the tank has been refilled and is to be emptied into the suction line. The shutoff valves are usually located underground and it has been difficult to provide a satisfactory mechanism for effecting unseating thereof, particularly since the pits in which such valves are installed usually fill with drainage water, mud and debris.

The principal objects of the present invention are, therefore, to provide a combination shutoff and check valve to control flow in either direction in the form of a unitary device, thereby simplifying the construction and installation in a pipe line; to provide a control device which has operating means accessible above ground for effecting unseating of the shutoff valve; to provide an unseating mechanism that is unaffected by and protected from mud and water and other accumulations around the shutoff valve; and to provide an unseating mechanism which also serves as a guide for the check valve element of the unit assembly.

A further object of the invention is to provide a readily accessible bleeder valve for the control unit whereby any air or gases that tend to accumulate are automatically vented.

In accomplishing these and other objects of the invention, I have provided improved structure, the preferred form of which is illustrated in the accompanying drawings wherein:

Fig. 1 is a vertical section through a control device constructed in accordance with the present invention and showing the shutoff valve and check valve members in unseated position to establish flow from a tank to a gathering line.

Fig. 2 is a perspective view of the lower section of the valve housing, the check valve member, and the valve seat and shutoff valve guide shown in disassembled spaced relation with a portion of the lower housing section broken away to better illustrate the valve unseating device.

Fig. 3 is a perspective view of the parts composing the operating means and the housing for the shutoff valve unseating device.

Fig. 4 is a side elevational view of the lower portion of the control device, a part being shown in vertical section and illustrating the check valve member in seated position and the tank flow shutoff valve member in open position.

Referring more in detail to the drawings:

1 designates a portion of a pipe line through which a liquid petroleum is caused to flow by gravity from a field tank or battery of tanks (not shown) to a gathering line 2 leading to the suction connection of a pump (not shown) by which the liquid is discharged under pressure to a pipe line leading to distant loading docks or other places of storage. Connected between the terminal of the pipe line 1 and the inlet of the pipe 2 is an automatic flow control device 3 embodying the features of the present invention.

The device 3 includes a valve body or casing 4, which for ease of assembly is composed of a T-shaped section 5 and a lower L-shaped section 6. The section 5 has a laterally extending and internally threaded branch 7 for connection with the pipe 1 and upper and lower internally threaded branches 8 and 9 for receiving the threaded end of a tube 10 and the section 6 respectively. The L-shaped section 6 of the casing includes a vertical branch 11 provided with external threads engaging the internal threads of the lower branch 9, as best shown in Figs. 1 and 4, and a lateral branch 12 that is provided with external threads for connecting the pipe 2 by means of a suitable coupling or the like 13. Carried by one of the sections of the casing, for example the section 6, is a seating ring 14 forming a port 15 through which liquid from the pipe 1 flows to the pipe 2.

The ring 14 may be externally threaded and connected with internal threads of the branch 11 of the casing section 6. The upper face of the ring has a collar 16 encircling the port 15 to provide an annular valve seat 17. The under side of the ring is provided with a recess 18 in which is formed a downwardly facing bevelled seat 19 also encircling the port 15. The tube 10 cooperates with the branch 3 of the T-section to form a float valve chamber 20 which has its upper end closed by a cap 21. Carried by the ring 14 in circular series about the collar and seat 17 are upstanding guide fingers 22. The fingers are for guiding a shutoff valve 23 into closing relation with the port 15 upon absence of liquid within the float chamber, as when the tank is empty, so that the pump cannot draw air or vapors from the tank into the pipe line. The shutoff valve 23 is constructed to be buoyant in the liquid and when disengaged from its seat rises upwardly within the liquid and floats thereon within the float chamber 20, as illustrated in Fig. 1, where the valve is out of the way of flow of liquid from the pipe 1.

As above mentioned, the casing of the control device is usually located below ground and is provided with means to effect unseating of the float valve 23 from above ground. This is effected by a lifting member 24 having a shank portion 25 reciprocable within a stuffing box 26 that is carried by the lateral branch 11 of the lower casing section 6. The stuffing box includes a collar 27 that is welded in encircling relation with an opening 28 that passes the shank 25 of the lifting device therethrough. The collar 27 is internally threaded for mounting a packing nut 29 that compresses a packing 30 about the shank portion of the rod and prevents leakage of liquid through the opening 28. The lower end of the shank 25 terminates in a laterally extending arm 31 that normally rests on a bottom of the casing section 6, as shown in Figs. 1 and 4, and carries a finger 32 in coaxial relation with the port 15. The finger 32 terminates below the seating ring 14 to allow seating of the float valve. The arm 31 is retained between spaced guide rods 33 and 34 that are fixed vertically within the lateral branch 12 to cooperate with the stuffing box in retaining coaxial alignment of the finger with the port 15.

Since the shank 25 of the lifting member must terminate close to the housing in order to permit easy insertion thereof, an extension rod 35 is necessary to permit operation from above ground. The extension is connected with the rod by a coupling 36 and the upper end has a T-shaped handle 37. It is desirable to provide a housing for the rod 35 in the form of a pipe 38 which has its lower end threaded into an external collar 39 encircling the stuffing box as best shown in Fig. 1. The pipe 38 is of sufficient length to extend above the ground and its upper end is closed by a cap 40 having an opening 41 therein for passing the actuating rod. In order to retain the finger in retracted position, the rod 35 carries a coil spring 42 having one end seated on the coupling 36 and the other end bearing against the under side of the cap 40.

As above stated, certain of the tanks may be located at higher levels, and in order to prevent back flow into the line 1 I provide a buoyant check valve member 43 that is slidably mounted on the finger 32 and has a valving face 44 at its upper end adapted to engage the seat 19 and stop reverse flow of liquid. In order to prevent leakage through the check member 43, the valve end thereof carries a sleeve 45 that covers the finger 32 of the valve unseating device and which has its upper end closed as at 45' to seat upon the end of the finger when the actuating rod is lifted to effect unseating of the float valve.

The control device is provided with means for venting any gases tending to be trapped therein. The venting means is carried by the cap 21 and includes a plug 46 threaded into an opening 47 of the cap and which is of ample diameter to permit removal of the working parts of the vent or bleeder. The plug has an internally threaded opening 48 for mounting a fitting 49 having a neck portion 50 depending within the upper end of the float chamber to mount the bleeder valve body 51 having an axial passage 52 in connection with an axial port 53 in the fitting 49. Formed within the body 51 is a downwardly facing conical valve seat 54 that is adapted to be engaged by a conical valve 55 on a rod 56 that is slidably mounted in an axial bore 57 formed in a plug 58 closing the lower end of the bleeder. Formed in the sides of the bleeder body and immediately below the valve seat 54 are a plurality of inlet ports 59 for gases which collect within the upper portion of the float chamber and which gases are discharged through the port 53 when the valve 55 is in unseated position. When the liquid rises within the float chamber 20, it is necessary to effect closure of the valve 55, otherwise the liquid would continue to rise and flow outwardly through the port 53. The stem or rod 56 is therefore provided with a float 60 having sufficient buoyancy to raise the valve and effect seating thereof so as to prevent discharge of liquid out of the bleeder port.

The valve 55 may also be operated by the shutoff valve 23 when the shutoff valve is unseated to rise within the liquid within the float chamber until the upper end of the float valve engages a cushioning spring 61 which is suspended from the lower end of the float 60, the spring being sufficiently rigid to effect seating of the bleeder valve under operation of the float valve. Threaded into the upper end of the fitting 48 is a check valve fitting 62 having a seat 63 and ball 64 which prevents intake of air into the float chamber 20 under the suction effect of the liquid flowing through the pipe line but which opens when pressure accumulates in the float chamber.

In order to exclude moisture and the like from entering the float chamber, the outlet port of the check valve fitting may be provided with an L 65 carrying a lateral pipe nipple 66 which mounts on the outer end thereof an L 67 carrying a downturned nipple 68.

Assuming that the control device is constructed and assembled as described, and that it is connected between the pipe lines 1 and 2 as shown in the drawings, and that the tank to which the pipe 1 is connected is empty, the float valve 23 is closing the port 15 since any liquid remaining in the housing is not sufficient to float the valve. Therefore air cannot be drawn by the pumps through the tanks into the pipe line 2. Any gas pressure tending to accumulate in the tank will be vented through the float chamber 20 and bleeder valve body 51 to the atmosphere.

When the tank 1 is filled with liquid, the liquid flows through the pipe 1 and rises within the float chamber 20. The liquid rising in the float chamber may tend to foam and the foam will push upwardly therein but very little foam can pass into the relatively small inlet ports 59 of the bleeder, consequently the foam will be trapped within the space at the top of the float chamber and be consolidated with the liquid rising therein. When it becomes desirable to empty the tank, the handle 37 will be drawn upwardly to raise the operating rod 35 against action of the spring 42 so as to raise the check valve 43 and bring the sleeve 45 thereon upwardly through the outlet port 15 to engage and effect unseating of the valve 23. The valve 23 upon disengagement with the seat bobs upwardly through the liquid in the float chamber and is kept in an out of way position while the liquid is flowing through the valve seat and into the line 2. Since the flow of liquid is in opposition to the direction of movement of the check valve float 43, it will remain in guided position on the finger of the lifting rod when the spring 42 returns the unseating mechanism to its original position upon releasing of the handle 37. However, should the flow tend to reverse, the lifting action of the liquid on the check valve 43 will cause it to rise and engage the seat 19 to prevent back flow into the pipe 1. When the pressure drops in the pipe 2 the check float returns to its normal position.

When the oil is flowing from the tank through the port 15, it eddies therethrough and the eddy currents flowing around the check valve 43 causes it to spin upon the pin or finger 32. The check valve is therefore kept free from gumming up with paraffin or corrosion and is always in operating condition.

From the foregoing it is obvious that I have provided a simple and inexpensive flow control device which embodies a shutoff valve, check valve, and bleeding apparatus all in a self-contained unit which is easily manufactured and installed in a pipe line.

What I claim and desire to secure by Letters Patent is:

1. A control device of the character described including, a casing having an upper inlet and a lower outlet, means forming upper and lower valve seats within the casing at a point intermediate the inlet and outlet, a float valve in the casing on the inlet side and adapted to engage the seat on the inlet side in the absence of flow of liquid through the inlet, means for unseating the valve including a reciprocatory member extending into the casing at a point below said seats and having a laterally directed arm terminating in a finger coaxially of said seats and adapted to unseat the float valve upon reciprocation of said member in one direction, a buoyant check valve having a sliding support on said finger for engaging the seat on the outlet side responsive to back flow of liquid into the outlet, a stuffing box carried by the casing and forming a seal about the reciprocatory member, and a spring for moving the reciprocatory member in the opposite direction for retracting said finger.

2. A control device of the character described including, a casing having an upper T-shaped section to provide a lateral branch for connection with an inlet pipe and an upper branch and a lower branch, said casing including a lower L-shaped section to provide a branch in connection with the lower branch of the T-shaped section and a lateral branch forming an outlet, a tubular member connected with the upper branch of the T-shaped section for forming a float valve chamber, a float valve in said chamber, means in the lower branch of the T-shaped section forming a port and an encircling seat for said float valve, an actuating member including a stem extending into the lateral branch of the L-shaped section and having a laterally directed portion terminating in an upstanding finger in coaxial relation with the port, a stuffing box connected with said lateral branch of the L-shaped section for sealing around said stem, a spring housing connected with said lateral branch and extending upwardly alongside of the T-shaped section, an actuating rod extending coaxially within the spring housing and having connection with said stem, a spring in the spring housing to retain said stem in retracted position, and a cap closing the upper end of the spring housing and forming a bearing for the upper end of said actuating rod.

3. A control device of the character described including, a casing having an upper T-shaped section to provide a lateral branch for connection with an inlet pipe and an upper branch and a lower branch, said casing including a lower L-shaped section to provide a branch in connection with the lower branch of the T-shaped section and a lateral branch forming an outlet, a tubular member connected with the upper branch of the T-shaped section for forming a float valve chamber, a float valve in said chamber, means in the lower branch of the T-shaped section forming a port and an encircling seat for said float valve, an actuating member including a stem extending into the lateral branch of the L-shaped section and having a laterally directed portion terminating in an upstanding finger in coaxial relation with the port, a stuffing box connected with said lateral branch of the L-shaped section for sealing around said stem, a spring housing connected with said lateral branch and extending upwardly alongside of the T-shaped section, an actuating rod extending coaxially within the spring housing and having connection with said stem, a spring in the spring housing to retain said stem in retracted position, a cap closing the upper end of the spring housing and forming a bearing for the upper end of said actuating rod, and venting means connected with the upper end of the float chamber for venting gas from the casing.

4. A control device of the character described including, a casing having an upper T-shaped section to provide a lateral branch for connection with an inlet pipe and an upper branch and a lower branch, said casing including a lower L-shaped section to provide a branch in connection with the lower branch of the T-shaped section and a lateral branch forming an outlet, a tubular member connected with the upper branch of the T-shaped section for forming a float valve chamber, a float valve in said chamber, means in the casing forming a port and encircling oppositely facing seats, an actuating member including a stem extending into the lateral branch of the L-shaped section and having a laterally directed portion terminating in an upstanding finger in coaxial relation with the port to unseat the float valve from the upper seat, a stuffing box connected with said lateral branch of the L-shaped section for sealing around said stem, a spring housing connected with said lateral branch and extending upwardly alongside of the T-shaped section, an actuating rod extending coaxially within the spring housing and having connection with said stem, a spring in the spring housing to retain said stem in retracted position, a cap closing the upper end of the spring housing and forming a bearing for the upper end of said actuating rod, and a buoyant check valve slidable on said finger and adapted to engage the lower of said seats.

5. A control device of the character described including, a casing having an upper lateral branch for connection with an inlet pipe and having a lower lateral branch for connection with an outlet pipe, a tubular member connected with the casing above the upper branch for forming a float valve chamber, a float valve in said chamber, means in the casing between said branches for forming a valve port and an encircling valve seat for seating said float valve, an actuating member including a stem extending into the lower lateral branch and having a laterally directed arm terminating in an upstanding finger in coaxial relation with the port, a stuffing box connected with said lateral branch for sealing around said stem, a spring housing enclosing the stuffing box and extending upwardly alongside of the casing, an actuating rod extending coaxially within the spring housing and having connection with said stem, a spring in the spring housing to retain said stem in retracted position, and a cap closing the upper end of the spring housing and forming a bearing for the upper end of said actuating rod.

6. A control device of the character described including a casing having an upper inlet and a lower outlet, means forming a valve seat within the casing at a point intermediate the inlet and outlet, a combination check and stop valve in the casing on the outlet side of said seat, said valve being buoyant to engage said seat upon backflow of liquid from the outlet, and a reciprocatory member extending into the casing at a point below said seat and having a laterally directed arm terminating in an upwardly extending finger coaxially of said seat, said valve having a guide sleeve fixed thereto and reciprocable on the finger to and from seating relation with the valve seat, said guide sleeve having a closed upper end, said guide finger and sleeve having relative lengths whereby the valve operates as a check independently of said reciprocatory member and whereby the finger is adapted to engage said closed end to seat the valve upon operation of the reciprocatory member.

7. In a control device of the character described a casing having an upper inlet and a lower outlet, means forming a valve seat within the casing at a point intermediate the inlet, a buoyant valve in the casing on the outlet side of said seat and adapted to engage said seat upon backflow of liquid from the outlet when the valve is in use, and a finger in the casing coaxially of said seat, said valve having a guide sleeve fixed thereto and reciprocable on said finger, said guide sleeve having a closed upper end and having a length relative to the length of the finger whereby the valve is retained in guided position by the finger when the valve operates as a check.

8. In a control device of the character described a casing having an upper inlet and a lower outlet, means forming a valve seat within the casing at a point intermediate the inlet, a buoyant valve in the casing on the outlet side of said seat and adapted to engage said seat upon backflow of liquid from the outlet when the valve is in use, a finger in the casing coaxially of said seat, said valve having a guide sleeve fixed thereto and reciprocable on said finger, said guide sleeve having a closed upper end and having a length relative to the length of the finger whereby the valve is retained in guided position by the finger when the valve operates as a check, and means connected with the finger for shifting the finger against said closed end of the guide sleeve to lift said valve into seating engagement with said seat.

9. A device for automatically shutting off flow of a liquid when the flow of liquid ceases in one direction and to prevent backflow of the liquid from the opposite direction including a casing having an inlet and an outlet spaced below the inlet, means in connection with the casing intermediate the inlet and outlet forming opposed valve seats in encircling relation with and common to a flow port connecting the inlet and outlet, a buoyant valve in the casing adapted to float on the liquid admitted through the inlet to open said port and to float into seating position to close said port when the flow of liquid tends to cease through the inlet, a combination check and stop valve in the casing separate from and adapted to engage said seat on the outlet side of the casing responsive to backflow of the liquid from the outlet, a finger in the casing coaxially of the seat on the outlet side of said port, said combination check and stop valve having a guide sleeve extending from said stop and check valve and adapted to reciprocate on said finger to project through the flow port when the combination check and stop valve is seated, said guide sleeve having a closed upper end to prevent flow of liquid through said sleeve, and manual means for seating said combination check and stop valve and to bring said guide sleeve into contact with the buoyant valve when said buoyant valve is in seated position to effect manual unseating of the buoyant valve from said seated position.

JOHN T. CRONKHITE.

References Cited in the file of this patent

UNITED STATES PATENTS

| Number | Name | Date |
|---|---|---|
| 751,005 | Philp | Feb. 2, 1904 |
| 1,362,150 | Shealy | Dec. 14, 1920 |
| 1,831,318 | Oneil | Nov. 10, 1931 |
| 2,210,751 | Cronkhite | Aug. 6, 1940 |
| 2,442,642 | Eckel | June 1, 1948 |
| 2,496,518 | Candler | Feb. 7, 1950 |